United States Patent
Tseng et al.

(10) Patent No.: US 6,954,357 B2
(45) Date of Patent: Oct. 11, 2005

(54) DETACHABLE NOTEBOOK COMPUTER

(75) Inventors: Tien-Chun Tseng, Taipei Hsien (TW);
Chu-Chia Tsai, Taipei Hsien (TW);
Chao-Hsin Chen, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 0 days.

(21) Appl. No.: 10/604,973

(22) Filed: Aug. 28, 2003

(65) Prior Publication Data

US 2004/0196625 A1 Oct. 7, 2004

(30) Foreign Application Priority Data

Apr. 4, 2003 (TW) ........................................ 92107820 A

(51) Int. Cl.$^7$ ................................................. G06F 1/16
(52) U.S. Cl. ..................... 361/684; 361/816; 364/708.1; 70/57
(58) Field of Search ................................ 361/678–687, 361/724–727, 800, 816, 818; 364/708.1; 439/638; 70/57–58; 312/223.2

(56) References Cited

U.S. PATENT DOCUMENTS

| | | | | |
|---|---|---|---|---|
| 6,456,491 | B1 | * | 9/2002 | Flannery et al. ............. 361/685 |
| 6,469,900 | B2 | * | 10/2002 | Cheng ......................... 361/726 |
| 6,525,932 | B1 | * | 2/2003 | Ohnishi et al. ............. 361/686 |
| 6,728,115 | B1 | * | 4/2004 | Le et al. ..................... 361/816 |

FOREIGN PATENT DOCUMENTS

CN          2263802 Y        10/1997

* cited by examiner

*Primary Examiner*—Hung Van Duong
(74) *Attorney, Agent, or Firm*—Winston Hsu

(57) ABSTRACT

A portable computer includes a housing, a power supply, a liquid crystal display panel, a keyboard, a pointing device control unit, and a cassette. The housing has a recess, and the cassette is detachably installed in the recess. The cassette includes a case, a motherboard, a central processing unit, a chipset, and a memory. The recess and the cassette are connected through a connection interface having a port for power supply, a display device connection interface, and a peripheral device connection interface, for transferring power and signals.

20 Claims, 3 Drawing Sheets

DETACHABLE NOTEBOOK COMPUTER

BACKGROUND OF INVENTION

1. Field of the Invention

The present invention relates to a notebook computer, and more particularly, to an assembled notebook computer.

2. Description of the Prior Art

A notebook computer, having the advantages of small size, lightweight, and portability, brings a lot of convenience or mobile users. The lightweight, small-sized, and portable notebook computer allows the users to access applications and word-processing at any place, and not to be bounded in front of a cumbersome desk. Generally speaking, a notebook computer fulfills the following requirements for the mobile users. First, the users are provided with convenience due to portability and being able to access everywhere. Actually, the notebook computer is most characterized by its portability. The meaning of portability is not only limited to being movable, but also means to utilize the notebook computer at any place. Secondly, the notebook computer is able to transmit information and display data immediately to fulfill the requirements of high efficiency meetings and high efficiency presentations. Thirdly, the notebook computer can be connected to various peripheral devices to expand functions of the notebook computer, and even replace the desktop computer. The requirements of function wise and quality wise are thus satisfied. In addition, the notebook computer has the advantages of saving space, having a beautiful design, having low energy consumption, and being free of radiation emission.

However, the price of a notebook computer is very expensive. With the same class of configuration, the price of a notebook computer is about one and a half times of that for a desktop computer. Furthermore, since the volume of the notebook computer is small, problem of poor heat dissipation frequently occurs. As a result, the functions of the notebook computer are limited, and cannot be a match for the desktop computer. In order to save occupied space, most of the notebook computers are designed in an all-in-one manner. Therefore, it is difficult to upgrade the hardware, and the users cannot upgrade the hardware by themselves according to their personal requirements, which can be easily done in a desktop computer. With the rapid development of computers, a notebook computer is usually replaced because of insufficient functions. A liquid crystal panel, adapted in the notebook computer as a display device, contributes to the advantages of the notebook computer, being small-sized, being lightweight, and being portable. Unfortunately, the liquid crystal display panel is one of the costly components to result in an expensive notebook computer. When the functions of system cannot meet the users requirements, most of the devices in the notebook computer are still usable, especially the liquid crystal display panel. It is thus very wasteful to replace the whole notebook computer.

As mentioned previously, a notebook computer can be carried conveniently by the users to provide the users with a mobile working environment. The users can utilize the notebook computer to transmit information and display data to improve the efficiency of meetings and presentations. In addition, the notebook computer can be connected to various peripheral devices to expand functions and even to replace a desktop computer. In other respects, the notebook computer is very expensive. The notebook computer is designed and fabricated in a small-sized and lightweight manner so as to be carried conveniently. Consequently, the heat dissipation problem is incurred to result in system functions of the notebook computer that are inferior to those of the desktop computer. Furthermore, when the system functions of the notebook computer cannot meet the users requirements, the users need to spend a lot of money to purchase a new notebook computer. At this time, most of the devices in the notebook computer are still usable. That means, replacing the whole notebook computer is not economical.

SUMMARY OF INVENTION

It is therefore a primary objective of the invention to provide an assembled notebook computer that is very easy to be upgraded to resolve the above-mentioned problem.

According to an embodiment of the claimed invention, a notebook computer comprises a housing having a recess, a power supply for providing electrical power to the notebook computer, a liquid crystal display installed on the housing for displaying data, a keyboard installed on the housing for inputting data, a touch pad installed on the housing for controlling the movement of a cursor on the display, and a cassette detachably installed in the recess. The cassette comprises a motherboard installed in the cassette, a central processing unit installed on the motherboard for processing data and programs, a chipset installed on the motherboard for communicating between the central processing unit and other peripheral devices, and a memory installed on the motherboard for storing data and programs. The cassette is connected to the notebook computer through at least one connection interface.

It is an advantage that the present invention notebook computer is divided into the cassette portion and the housing portion. The devices of cassette portion, such as the motherboard, the central processing unit, the chip set, and the memory, perform most of the system function of a computer. The housing portion comprises most of the peripheral devices, such as the power supply, the liquid crystal display panel, the keyboard, and the touch pad. If a user is not satisfied with the function of the original notebook computer, he need only to replace the cassette with a upgraded cassette to enhance the performance of this notebook computer. Therefore, the user need not discard the well-functioned, expensive liquid crystal display and other peripheral devices. On the other hand, if the keyboard, the touch pad, and/or the liquid crystal display panel are ruined by the user unintentionally, the user only need to replace the housing with another housing. In addition, for those "mobile office" workers traveling from one office to another office, or for companies in which several staffs sharing one computer, the cassette design provides more flexibility.

These and other objectives of the invention can easily be understood after reading the following detailed description of the preferred embodiment, which is illustrated in the various figures and drawings.

DETAILED DESCRIPTION

Figure 1:
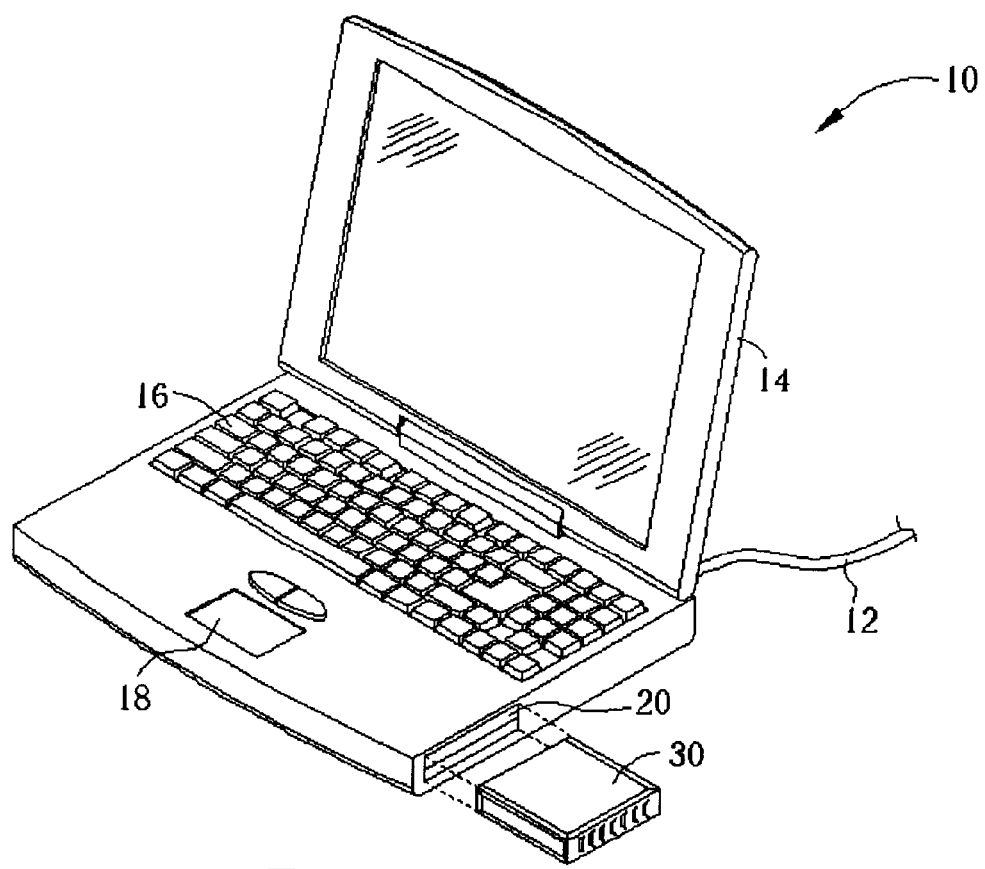
FIG. 1 is a schematic diagram of a present invention notebook computer.

Please refer to FIG. 1. FIG. 1 is a schematic diagram of a present invention notebook computer 10. Several devices related to system efficiency are installed in a cassette 30 to allow the users upgrade the notebook computer 10 conveniently. As shown in FIG. 1, a housing of the notebook computer 10 comprises a power supply 12, a liquid crystal display panel 14, a keyboard 16, a touch pad 18, and a recess slot 20. The power supply 12 of the notebook computer 10 may be an AC power source passing through a transformer or a battery. The advantage of the notebook computer 10 is that it can be utilized immediately after the power source 12 is electrically connected to a plug. The notebook computer 10 usually includes an exclusive lithium battery, and the lithium battery is able to maintain the operation of the notebook computer 10 for a period of time after being charged. The battery may be an internal battery or an external battery. The internal battery can bring a lot of convenience for the users when the users are carrying and utilizing the notebook computer 10. But consequently, the notebook computer 10 becomes heavier and the problem of poor heat dissipation can occur. The external battery, though it reduces the weight of the notebook computer 10 and does not have the problem of poor heat dissipation, is not as convenient as the internal battery. The liquid crystal display panel 14 is one of the costly components resulting in the expensive notebook computer 10. However, the liquid crystal display panel 14, having the advantages of being small-sized, being lightweight, and being free of radiation, is very suitable to be used as the display device of the notebook computer 10. In order to reduce the volume of the notebook computer 10, the keyboard 16 is usually small but has complete functions. The small-sized and lightweight keyboard 16 not only has a beautiful appearance, but also provides the users with a quiet environment owing to soundless keys. The touch pad 18 is used for controlling the movement of the cursor. In some of the notebook computers, the touch pad is replaced with a track ball or a joystick. The recess slot 20 is used for accommodating the cassette 30. The recess slot 20 comprises all of the required connection interfaces when connecting with the cassette 30. The connection interfaces are described as follows.

Figure 2:
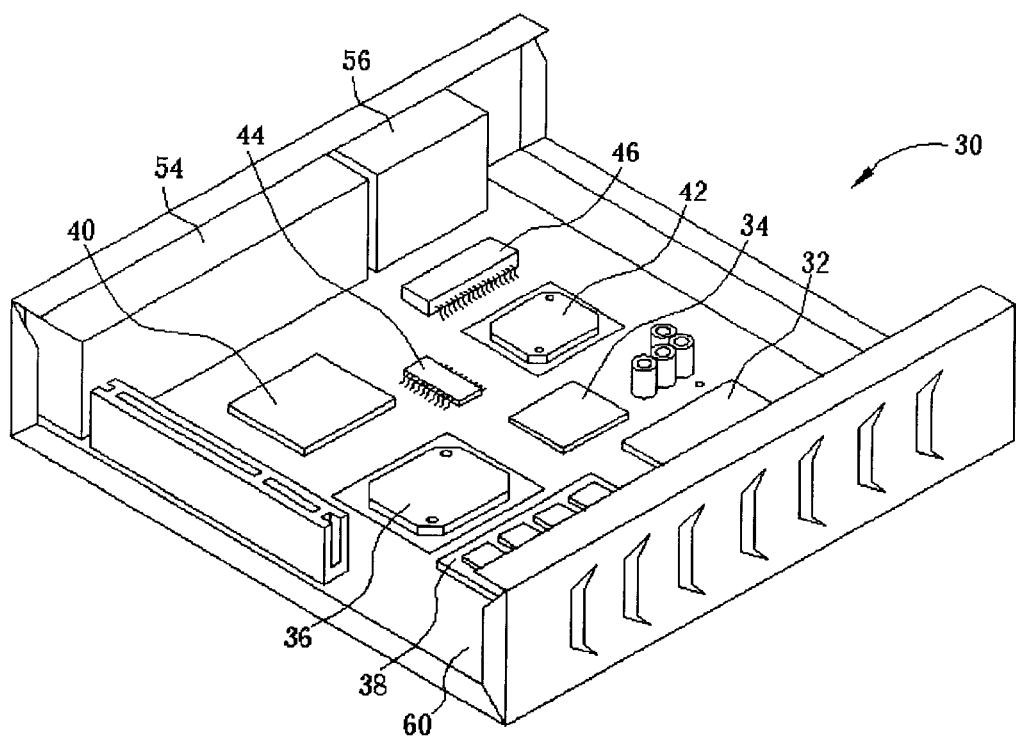
FIG. 2 is an interior schematic diagram of the cassette shown in FIG. 1.
Figure 3:
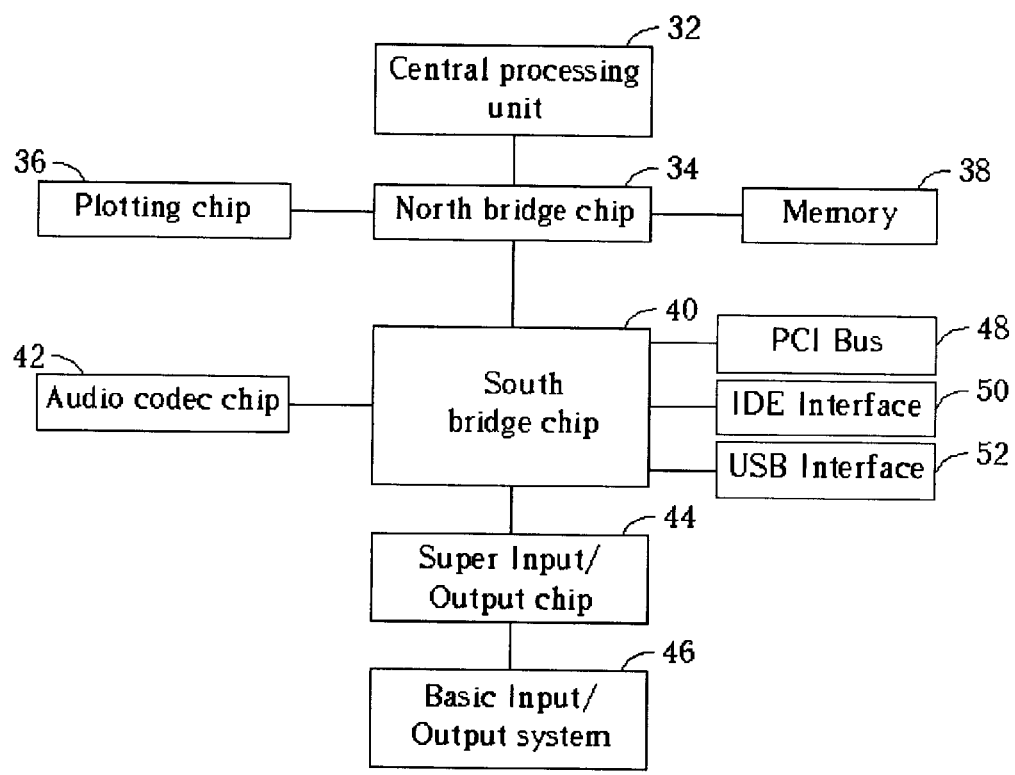
FIG. 3 is a functional block diagram of the cassette.

Please refer to FIG. 2 and FIG. 3. FIG. 2 is an interior-schematic diagram of the cassette 30 shown in FIG. 1. FIG. 3 is a functional block diagram of the cassette 30. The cassette 30 comprises a motherboard 60. A central processing unit (CPU) 32, a north bridge chip 34, a plotting chip 36, a memory 38, a south bridge chip 40, an audio codec chip 42, a super input/output (super I/O) chip 44, and a basic input/output system (BIOS) 46 are installed on the motherboard 60. The central processing unit 32, being the most important component, is the core for the operation of the notebook computer 10. When the computer system starts operating, the central processing units 32 will read programs and data of operation software from the memory 38, and will operate to obtain results through the arithmetic and logic unit (ALU) in the central processing unit 32. The results are thereafter stored in the memory 38. Communications between the motherboard 60 and peripheral devices, such as the input/output devices, thus achieve the objective of data processing. The north bridge chip 34 is responsible for the connections and communications with the central processing unit 32, the memory 38, and the plotting chip 36, all of which have a high time sequence. The north bridge chip 34 comprises the control circuits connected to the central processing unit 32, the control circuits for the expansion slot for the plotting chip 36, the control circuits connected to the memory 38, and the connection circuits for the south bridge chip 40. The main functions of the plotting chip 36 are to process the operation of graphs, animations, and images and to display data on the display. Furthermore, some of the plotting chips 36 are integrated into the north bridge chip 34. The memory 38 comprises a dynamic memory or a static memory. The function of the memory 38 is to store data and programs under processing. Since the saving/retrieving speed of the static memory is quicker, the static memory is usually used as a cache memory to store programs and data that are frequently used to improve the saving/retrieving speed of the central processing unit 32 to the memory 38. Moreover, data in the memory 38 is erased immediately after the power supply disappears. The south bridge chip 40 is responsible for the communications between the central processing unit 32 and the peripheral devices. The south bridge chip 40 comprises a control circuit for a PCI (peripheral component interconnect) bus 48, a control circuit for IDE (integrated device electronics) 50, a control circuit for USB (universal serial bus) 52, a control circuit for LPC (low pin count, not shown), a control circuit for AC (audio codec, not shown), and a connection circuit to the north chip 34. The audio codec chip 42, connecting to the south bridge chip 40 through an AC connection circuit, is used for processing the code/decoding of audio data. The super input/output chip 44, connecting to the south bridge chip 40 through an LPC interface (not shown), is used for controlling the connection of the floppy disk, and the input/output devices, such as serial ports (COM) and parallel ports (LPT). The basic input/output system 46 is stored in a read only memory (ROM) electrically connected to the super input/output chip 44. The basic input/output system 46 comprises the basic input/output procedures for the computer, the system message setting, the power on self test (POST) procedure, and the system initializing procedure.

The connection interface (not shown) of the cassette 30 and the data connection interface 54 of the recess slot 20 comprise a digital visual interface (DVI), a PCI interface, an IDE interface, a USB interface, an audio connection port, and a connection port for input/output devices. In addition, a connection port for power supply 56 is formed between the cassette 30 and the recess slot 20. The connection port for power supply 56 is connected to the power supply 12 of the notebook computer 10 to provide the electrical power required by the electric devices in the cassette 30. The digital visual interface is used for connecting to the liquid crystal display panel 14. The advantage of utilizing the digital visual interface is that no loss is induced when signals are transformed between the analog form and the digital form. The PCI interface provides connection between the cassette 30 and the PCI slot in the housing of the notebook computer 10. The PCI slot is used for accommodating a network card, a modem card, an audio card, a television card, etc. The IDE interface is used for connecting storage devices, such as a hard disk, an optical disk, and a CD recorder. The USB interface provides connections between the cassette 30 and the USB ports in the housing of the notebook computer to allow the users to install peripheral devices, such as the keyboard, the mouse, the digital camera, the modem, the scanner, and the printer, through the USB ports. The audio connection port is connected to a speaker on the housing of the notebook computer 10, and plugs of an earphone and a microphone. The connection port for input/output devices is used for providing connection between the super input/output chip 44 and input/output devices, such as the floppy disk, the serial ports and the parallel ports.

As mentioned previously, the cassette 30 of the present invention notebook computer 10 can be regarded as a small computer. In addition to the motherboard, the central processing unit 32, the chip set, and the memory 38, a hard disk or other memory device like SRAM can also be integrated into the cassette 30. Since the cassette 30 comprises all of the functions of a computer system, an external base may be conne Please refer to FIG. 2 and FIG. 3. FIG. 2 is an interiorschematic diagram of the cassette 30 shown in FIG. 1. FIG. 3 is a functional block diagram of the cassette 30. The cassette 30 comprises a motherboard 60. A central processing unit (CPU) 32, a north bridge chip 34, a plotting chip 36, a memory 38, a south bridge chip 40, an audio codec chip 42, a super input/output (super I/O) chip 44, and a basic input/output system (BIOS) 46 are installed on the motherboard 60. The central processing unit 32, being the most important component, is the core for the operation of the notebook computer 10. When the computer system starts operating, the central processing units 32 will read programs and data of operation software from the memory 38, and will operate to obtain results through the arithmetic and logic unit (ALU) in the central processing unit 32. The results are thereafter stored in the memory 38. Communications between the motherboard 60 and peripheral devices, such as the input/output devices, thus achieve the objective of data processing. The north bridge chip 34 is responsible for the connections and communications with the central processing unit 32, the memory 38, and the plotting chip 36, all of which have a high time sequence. The north bridge chip 34 comprises the control circuits connected to the central processing unit 32, the control circuits for the expansion slot for the plotting chip 36, the control circuits connected to the memory 38, and the connection circuits for the south bridge chip 40. The main functions of the plotting chip 36 are to process the operation of graphs, animations, and images and to display data on the display. Furthermore, some of the plotting chips 36 are integrated into the north bridge chip 34. The memory 38 comprises a dynamic memory or a static memory. The function of the memory 38 is to store data and programs under processing. Since the saving/retrieving speed of the static memory is quicker, the static memory is usually used as a cache memory to store programs and data that are frequently used to improve the saving/retrieving speed of the central processing unit 32 to the memory 38. Moreover, data in the memory 38 is erased immediately after the power supply disappears. The south bridge chip 40 is responsible for the communications between the central processing unit 32 and the peripheral devices. The south bridge chip 40 comprises a control circuit for a PCI (peripheral component interconnect) bus 48, a control circuit for IDE (integrated device electronics) 50, a control circuit for USB (universal serial bus) 52, a control circuit for LPC (low pin count, not shown), a control circuit for AC (audio codec, not shown), and a connection circuit to the north chip 34. The audio codec chip 42, connecting to the south bridge chip 40 through an AC connection circuit, is used for processing the code/decoding of audio data. The super input/output chip 44, connecting to the south bridge chip 40 through an LPC interface (not shown), is used for controlling the connection of the floppy disk, and the input/output devices, such as serial ports (COM) and parallel ports (LPT). The basic input/output system 46 is stored in a read only memory (ROM) electrically connected to the super input/output chip 44. The basic input/output system 46 comprises the basic input/output procedures for the computer, the system message setting, the power on self test (POST) procedure, and the system initializing procedure.cted to the cassette 30, and the base comprises the above-mentioned connection interfaces for connecting to the keyboard, the mouse, the display, the input/output devices, etc. Therefore, the cassette 30 of the present invention notebook computer 10 becomes a desktop computer. In order to be compatible with a common CRT display, a connector for VGA interface is provided by the cassette.

Comparing to the prior art notebook computer which is designed in an all-in-one manner to reduce volume and is difficult to upgrade, the present invention notebook computer is divided into the cassette portion and the housing portion. The devices of cassette portion, such as the motherboard, the central processing unit, the chip set, and the memory, perform most of the system function of a computer. The housing portion comprises most of the peripheral devices, such as the power supply, the liquid crystal display panel, the keyboard, and the touch pad. If a user is not satisfied with the function of the original notebook computer, he need only to replace the cassette with a upgraded cassette to enhance the performance of the notebook. Therefore, the user need not discard the well-functioned, expensive liquid crystal display and other periphery devices. If the keyboard, the touch pad, and/or the liquid crystal display panel are ruined by the user unintentionally, the user only need to replace the housing with another housing.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A portable computer having peripheral devices, comprising:
    a housing having a recess, a first connection interface being installed in the recess;
    a power supply installed in the housing for providing electrical power to the portable computer;
    a display panel installed on the housing for displaying data;
    a keyboard installed on the housing for inputting data;
    a pointing device control unit installed on the housing for controlling the movement of a cursor displayed on the display panel; and
    a cassette detachably installed in the recess, the cassette comprising:
        a case;
        a second connection interface installed on the case for electrically connecting to the first connection interface;
        a motherboard connected to the second connection interface;
        a central processing unit installed on the motherboard for processing data and programs;
        a chipset installed on the motherboard for communicating between the central processing unit and the peripheral devices of the portable computer; and
        a memory installed on the motherboard for storing data and programs.

2. The portable computer of claim 1 wherein the chipset comprises a north bridge chip electrically connected to the central processing unit, and a south bridge chip electrically connected to the north bridge chip.

3. The portable computer of claim 1 wherein the cassette further comprises a hard disk installed in the case.

4. The portable computer of claim 1 further comprising a hard disk installed in the housing.

5. The portable computer of claim 1 wherein the second connection interface on the case and the first connection interface in the recess comprise a PCI interface, an IDE interface, and a USB interface.

6. The portable computer of claim 1 wherein the second connection interface on the case and the first connection interface in the recess further comprise an audio connection port.

7. The portable computer of claim 1 wherein the second connection interface on the case and the first connection interface in the recess further comprise a connection port for input/output devices.

8. The portable computer of claim 1 wherein the second connection interface on the case and the first connection interface in the recess further comprise a DIV interface.

9. The portable computer of claim 1 wherein the second connection interface on the case and the first connection interface in the recess further comprise a VGA interface.

10. The portable computer of claim 1 wherein the second connection interface on the case and the first connection interface in the recess further comprise a connection port for power supply.

11. The portable computer of claim 1 wherein the pointing device control unit comprises a touch pad, a track ball, or a joystick.

12. The portable computer of claim 2 wherein the chipset further comprises a plotting chip electrically connected to the north bridge chip.

13. The portable computer of claim 2 wherein the chipset further comprises an audio codec chip and a super input/output (super I/O) chip electrically connected to the south bridge chip.

14. The portable computer of claim 13 wherein the cassette further comprises a read only memory (ROM) electrically connected to the super input/output chip, the read only memory storing a basic input/output system (BIOS).

15. A portable computer comprising:
   a housing having a recess, a first connection interface being installed in the recess;
   a power supply for providing electrical power to the portable computer;
   a display panel installed on the housing for displaying data;
   a keyboard installed on the housing for inputting data;
   a pointing device control unit installed on the housing for controlling the movement of a cursor on the display panel; and
   a cassette detachably installed in the recess comprising:
      a case;
      a second connection interface installed on the case for electrically connecting to the first connection interface; and
      a central processing unit installed in the case for processing data and programs.

16. The portable computer of claim 15 further comprising a motherboard installed in the case, the central processing unit being installed on the mother board.

17. The portable computer of claim 15 further comprising a chipset installed in the case for communicating between the central processing unit and peripheral devices of the portable computer.

18. The portable computer of claim 15 further comprising a memory installed in the case for storing data and programs.

19. The portable computer of claim 15 wherein the second connection interface on the case and the first connection interface in the recess further comprise a connection port for power supply, a display device connection interface, and a peripheral device connection interface.

20. The portable computer of claim 15 wherein the central processing unit is a system central processing unit capable of controlling operations of the portable computer.

* * * * *